J. N. REYNOLDS.
INDICATOR FOR FLYING MACHINES.
APPLICATION FILED SEPT. 29, 1917.
1,351,538.
Patented Aug. 31, 1920.
2 SHEETS—SHEET 2.
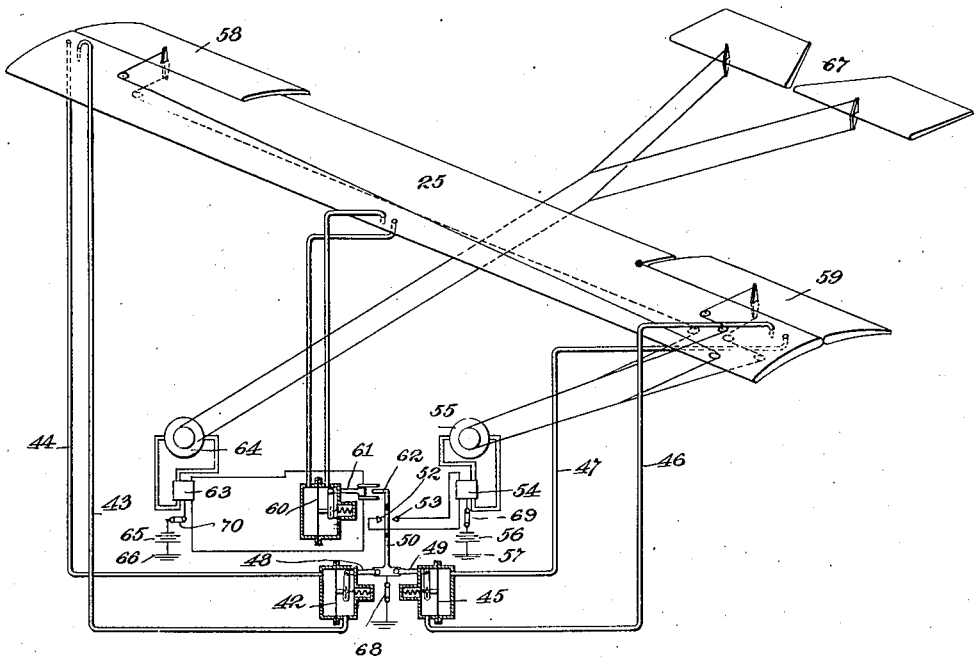

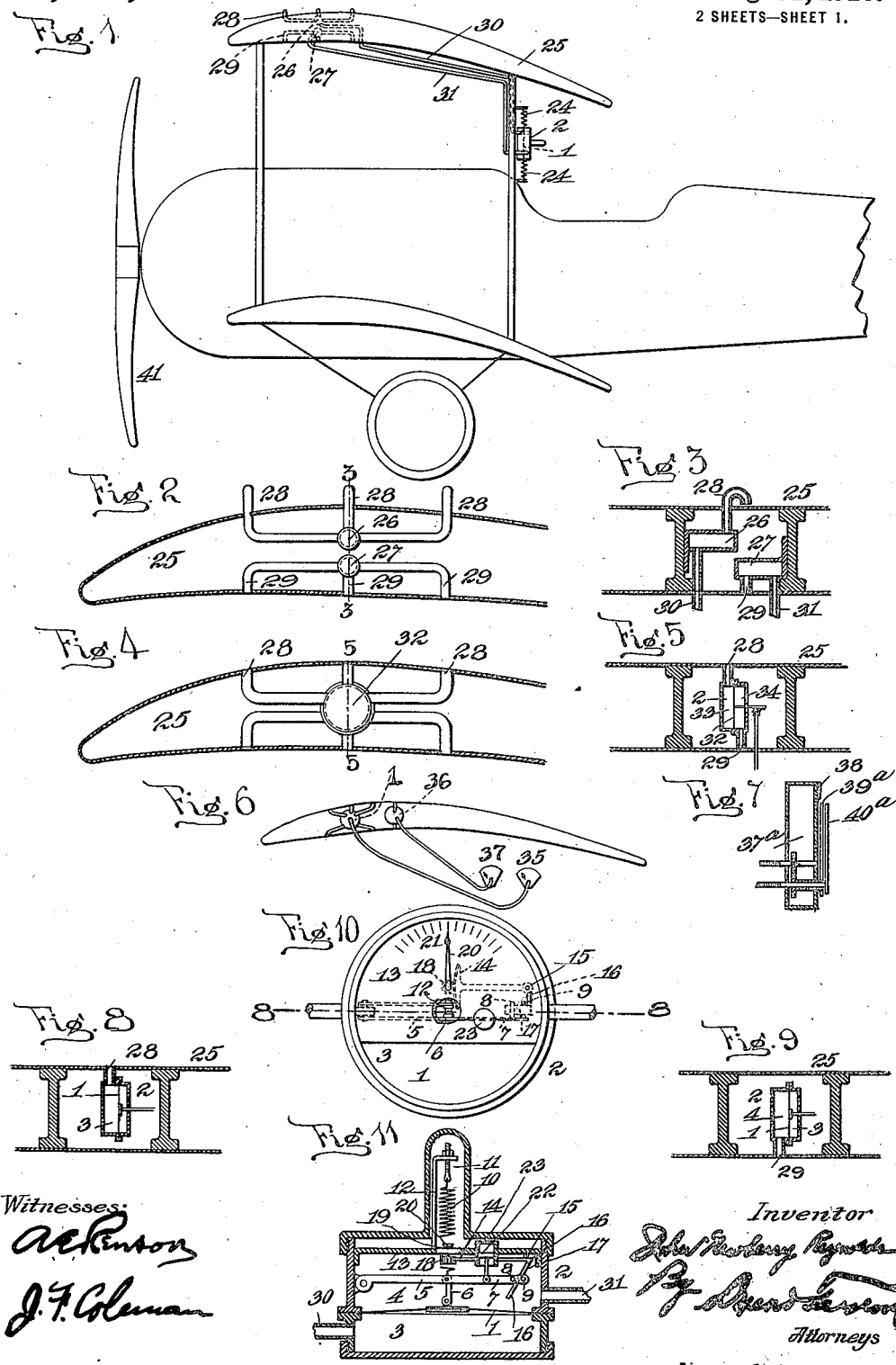

UNITED STATES PATENT OFFICE.

JOHN NEWBERRY REYNOLDS, OF GREENWICH, CONNECTICUT.

INDICATOR FOR FLYING-MACHINES.

1,351,538.   Specification of Letters Patent.   Patented Aug. 31, 1920.

Application filed September 29, 1917. Serial No. 193,901.

*To all whom it may concern:*

Be it known that I, JOHN NEWBERRY REYNOLDS, a citizen of the United States, residing in the town of Greenwich, county of Fairfield, and State of Connecticut, have invented a certain new and useful Indicator for Flying-Machines, of which the following is a specification.

My invention relates to flying machines of the heavier-than-air type in which the weight is sustained in the air by the reactions resulting when the aerofoils are moved through the air edgewise. The movement of the aerofoils through the air causes a reaction on the planes resulting in both positive and negative pressures being exerted on the lower and upper faces respectively. Positive pressure being caused by the piling up, as it were, of the air against the lower face or camber of the aerofoil and negative pressure being a rarefaction of the air or partial vacuum over the upper surface. It is the resultant upward components of these reactions which cause the machine to be sustained above the surface of the earth. The magnitude of this sustaining force depends on two general conditions, i. e. the angle of the aerofoil to the air flow, called the angle of incidence, and the speed at which the machine is moved.

It is desirable that an aviator shall be informed at all times during flight as to the sustaining force acting on the aerofoils and that such sustaining force does not drop below a certain minimum value known as the stalling point, that is, that value at which the machine will not be sustained in the air. It is also desirable that the operator shall know the angle of incidence at which his machine is flying. The aviator may observe that his machine is not making the speed proportionate to the engine speed and if he be aware that the loss is due to a change in the angle of incidence it will be only necessary to bring the machine to the proper angle to get the proper speed.

One of the objects of my invention is to provide means for indicating the angle of incidence as well as for indicating the lift or sustaining force acting on the aerofoils at all times during flight.

A further object is to provide means whereby the positive and negative pressures may be taken from different points on the top and bottom cambers to provide for changes in center of support under varying conditions of use or to indicate the average pressures on considerable portions of the surfaces of the aerofoil.

A further object is to provide means whereby the indicator may be situated at a point removed from the aerofoil and within convenient reach of the aviator.

A further object is to prevent the entrance of water to the pressure responsive means, to eliminate vibrations of the device and to damp the moving system to lessen the sensitiveness of the device.

These and further objects will more fully appear in the following specification and accompanying drawings considered together or separately.

I have illustrated one embodiment of my invention in the accompanying drawings in which like parts in all of the several figures are indicated by similar reference characters and in which, Figure 1 is a side elevation of a portion of a biplane embodying my invention.

Fig. 2 is an enlarged sectional view of a portion of an aerofoil.

Fig. 3 is a section on the line 3—3 of Fig. 2.

Fig. 4 is a view similar to Fig. 2 showing the diaphragm located within the aerofoil.

Fig. 5 is a section on the line 5—5 of Fig. 4.

Fig. 6 is a diagrammatic view of a modification.

Fig. 7 is a detail view of a combined pressure and angle indicator.

Fig. 8 is a diagrammatic view of a further modification.

Fig. 9 is a diagrammatic view of a still further modification.

Fig. 10 is a face view, with parts removed, of one form of combined pressure responsive and indicating mechanism.

Fig. 11 is a section on the line 8—8 of Fig. 10.

Fig. 12 is a diagrammatic sketch of an assembly of an embodiment of the device shown in perspective.

Fig. 13 is a diagrammatic view of a device for longitudinal stabilizing.

Fig. 14 is a diagrammatic view of a device for making a permanent record of the movements of the pressure responsive devices; and Fig. 15 is a diagrammatic view of a form of device wherein the angle of incidence and the air speed are indicated on one dial.

In carrying out my invention I provide a diaphragm 1 which is secured at its periphery within a cylindrical casing 2 in any desired manner. The diaphragm divides the casing into two chambers 3 and 4. The chamber 3 communicates with the atmosphere at the top camber of an aerofoil while the chamber 4 is in communication with the atmosphere at the bottom camber of the same aerofoil.

A lever 5 is pivoted to the wall of the casing within the chamber 4. A link 6 connects the lever with the center of the diaphragm so that movements of the latter will be communicated to the lever. An extension 7 of the lever extends beyond the link 6 and is provided with a pair of spaced anti-friction rollers 8 and 9. A spring 10 is attached to the lever 5 in proximity to the link 6. The other end of the spring is attached to a tensioning screw 11 carried by an arm 12 projecting from a bridge 13 which is supported in the chamber 4. The bridge is provided with an opening through which the spring passes.

A toothed segment 14 is pivoted at 15 on the bridge and is provided with an arm 16 which carries an inclined plate or cam 17. The arm 17 rests between the rollers 8 and 9 so that movement of the lever 5 caused by flexing the diaphragm 1 will be communicated to the segment and the latter will be caused to move in a plane perpendicular to the movement of the said lever. The teeth of the segment engage a pinion 18 on a spindle 19 journaled in the bridge and a pointer 20 on the spindle will be caused to travel over a dial 21 shown in Fig. 10.

The lever 5 may carry a plunger 22 to coöperate with a dash pot 23 carried by the bridge 13 whereby the movements of the parts are damped and excessive vibration eliminated.

In Figs. 1, 2 and 3 I show an arrangement wherein the pressure responsive and indicating means are located within convenient reach of the aviator. This is accomplished by mounting said means on the fuselage in proximity to the driver's seat and in communication with the atmosphere at the top and bottom cambers of an aerofoil. I have shown the device in connection with a biplane but it will be understood that the apparatus may be employed on flying machines having any number of sustaining planes or aerofoils.

In Fig. 1 I illustrate the casing 1 as carried by the framework by means of which the wings are held in position and over the front end of the cockpit in which the operator is seated. The casing is preferably suspended and positioned by means of springs 24 so that it will not be influenced by vibration of the machine.

In one of the aerofoils 25 are located two pockets 26 and 27. The pocket 26 is provided with a plurality of tubes 28, each of which communicates with the atmosphere at or near the upper surface of the wing but at different points longitudinally of the machine. The pocket 27 has a similar number of tubes 29 communicating with the atmosphere at the lower face of the wing at points directly opposite the outlets of the tubes 28. The pocket 26 is in communication with the chamber 3 by means of a conduit 30 and the pocket 27 is in communication with the chamber 4 by means of a conduit 31. A portion at least of each conduit is flexible to allow for slight relative movement of the casing 2. In order to prevent the admission of water to the mechanism I place a water seal in each of the tubes 28. Any form of water seal may be employed. I have shown, in Fig. 3, the projecting ends of the tubes turned over with their open ends in proximity to the surface of the plane.

In Figs. 4, 5 and 6 I show a form of my improved indicator in which the pressure responsive and indicating elements are separated, the first being located within the aerofoil and the second in proximity to the operator.

In Figs. 4 and 5 is illustrated a diaphragm 1 carried in a casing 32 and separating the same into two chambers 33 and 34. The chamber 33 is in communication with the atmosphere at the top surface of the aerofoil while the chamber 34 receives the air pressure at the bottom surface. The indicator may be located at any convenient point on the machine and movements of the diaphragm communicated thereto in any desired manner as, for example, by means of a flexible shaft.

In Fig. 6 I have shown an arrangement by means of which the sustaining force acting on the aerofoil will be indicated, as will also any variations in the angle of incidence. In this form of the invention I mount the diaphragm 1 within the aerofoil in the same manner as is shown in Figs. 4 and 5. Variations in the position of the diaphragm will be communicated to an indicator 35 located at a convenient point on the fuselage. A second diaphragm 36 is located within the aerofoil and one side of it is actuated by the negative pressure on the top of the plane and the other side is influenced by the positive pressure on the lower face of the aerofoil. Movements of the diaphragm 36 are communicated to an indicator 37 which is preferably supported alongside of the indicator 35 so that both may be simultaneously observed. Readings on the scale 35 will indicate the sustaining pressure and on the dial 37 variations in the angle of incidence will be observed. Instead of employing two indicators one may be employed to give both readings. Such a device is shown in Fig. 7. A scale 38 is employed with which coöperates two pointers 39ª and 40ª capable of independent rotation as in a clock. The pointer 39ª is governed in its movements by the diaphragm 1 while the pointer 40ª moves with the diaphragm 36.

While I have shown my invention in position to indicate the pressures on the upper aerofoil of a biplane, I desire to have it understood that I do not wish to limit myself to such a construction. The device may be applied to any plane of a multiplane machine. Separate devices may be employed for each plane or several diaphragms may be located at different points on the machine, all communicating with a single indicator so that the average lift at various points of the apparatus may be indicated.

I have shown the diaphragm arranged in the vertical plane but it will be understood that the position of the same is immaterial, it being only necessary that one side of the diaphragm be in communication with the atmosphere on one side of the aerofoil and the opposite side of the diaphragm be in communication with the other side of the sustaining plane.

The operation is as follows:—

When the machine is at rest the air pressure is equal on both sides of the diaphragm and it will assume a neutral position. As the machine is moved by the propeller 41, the air pressure on that side of the diaphragm open to the bottom camber will increase and the pressure on the opposite side will decrease. This will cause a movement of the diaphragm in one direction and by properly calibrating the spring 10, the device will be made to weigh at all times the force tending to maintain the airplane in the air.

If with a given speed the indicator shows that the lift is not sufficient to support the machine at which it is flying, the operator will swing the tail flap upward. This will point the nose of the machine upward until the indicator denotes that there is sufficient lift acting on the aerofoil to support the machine. The pressure may be taken from one point on each surface of the aerofoil. It may be taken from a plurality of points at right angles to the line of flight. It may be taken from any one of a number of different points in line with the line of flight. It may be taken as an average of many widely separated points on any or all of the sustaining or steering planes or from any other desired point on the machine.

The center of pressure moves back toward the trailing edge of the aerofoil as the angle of incidence is decreased.

If during flight the center of pressure is in the vicinity of the tubes leading to the diaphragm 36 and the rear tubes leading to the diaphragm 1, the same pressures will be on each diaphragm and the pointers of 37 and 35 will occupy the same relative position in their respective dials and indicate the lift. Should the angle be raised, as by a gust of wind, the center of pressure will move toward the leading edge of the aerofoil and to the vicinity of one of the other outlets from the diaphragm 1. The pointer 35 will therefore remain practically stationary but the pressure on one side of diaphragm 36 having been released will cause that diaphragm to flex in the direction of least resistance and the hand 37 will be moved to one side or the other of the position occupied by the hand 35. The aviator will know that the machine is not proceeding with the plane at the same angle and he will manipulate the elevator to raise or lower the nose of the machine as the finger 37 has moved to one side or the other of the position of the hand 35 until the hands are brought to the same relative positions on the scales.

If the speed of the machine changes due to variations in the engine speed or changes in the wind pressure, the hands 37, 35 will move relatively to each other indicating that the angle of the aerofoil is not the desirable angle of incidence of the new speed and the aviator, by observing the manner in which the pointers are traveling relatively to each other, and also to the scales will know in which direction to move the elevators to bring the machine back to the proper angle for the speed at which the machine is traveling.

When a single indicator such as is shown in Fig. 7 is employed the hands 39ª and 40ª will coincide. When the angle of incidence changes the hand 39ª may remain stationary but the hand 40ª will be moved.

It is obvious that while a reading of the sum of the positive and negative forces is desirable a reading of either of these pressures may be sufficient. I have illustrated in Fig. 9 a form of my invention, wherein the diaphragm is acted on by the positive pressure on the lower camber of an aerofoil and in Fig. 8 a form in which the negative pressure on the top camber may be ascertained.

The forms of the device shown in Figs. 8 and 9 may be employed in connection with a diaphragm for recording the lifting forces, as 1 in Fig. 6 or for recording changes in the angle of incidence as 36 in Fig. 6.

It will, of course, be understood that the indicator will act in the same manner when the engine is cut out and the machine is gliding as when the engine is running and the propeller is in operation.

While I have shown and described the tubes 28 and 29 as similar in number, and as communicating with the atmosphere directly opposite each other, I desire to have it understood that I do not wish to limit myself to such an arrangement. The outlets of the tubes may be at any desired point and the number on one camber may differ from that on the other camber.

In the arrangement shown in Fig. 6 both diaphragms 1 and 36 will respond to changes in lift, but the diaphragm 36 will be moved to a greater extent than the diaphragm 1. The difference between the movements of the diaphragms will indicate the angle of incidence.

In Fig. 12 I have shown diagrammatically an embodiment of my invention whereby stability in flight is secured. By my invention I provide means whereby changes in the angle of incidence of the machine in flight will automatically swing the elevator, cause the machine to stabilize or return to a condition of longitudinal equilibrium. I also provide means whereby variations in the lift or sustaining forces at or near the wing tips will automatically stabilize the machine with reference to the longitudinal axis.

In carrying out this form of my invention, I provide a diaphragm 42 arranged in a casing similar to that shown in Figs. 10 and 11. The casing at one side of the diaphragm communicates by means of a tube 43 with the atmosphere on the bottom camber at or near the right tip of the aerofoil 25. The opposite side of the diaphragm 42 is acted on by the atmosphere at the top camber of the same wing tip through a pipe 44.

A similar diaphragm 45 is connected up to the left wing tip in the same manner by tubes 46 and 47. The diaphragm 42 carries a bellcrank 48, having one arm projecting from the casing and the diaphragm 45 is provided with a similar bellcrank 49. The bellcranks are oppositely disposed with their projecting ends in proximity to each other. To the ends of the projecting arm of the bellcrank is pivoted a rocker arm 50 which is grounded. The arm is adapted to contact with either of two points 52 and 53. The points 52 and 53 are in circuit with a reversing box 54, a motor 55 and a source of energy 56 which is grounded at 57. The motor is geared to the ailerons 58 and 59 at the wing tips.

While I have shown the pipes 43, 44, 46 and 47 as each communicating with the atmosphere at one point, I desire to have it understood that they may be open at a plurality of points as shown in Figs. 2, 4 and 6.

A diaphragm 60 similar to 42 and 45 is similarly in communication with the atmosphere at or about the point of greatest pressure on the aerofoil. The projecting arm of the bellcrank 61 of the diaphragm 60 is bifurcated and its forked ends straddle a hook 62 on the arm 50. The forked ends are in circuit with a reversing box 63, motor 64 and source of energy 65, which is grounded at 66. The motor is geared to the elevator 67.

When it is desired to operate the elevator manually the motor 64 is disconnected and the control is taken over by the operator.

The operation of the device of Fig. 12 is as follows:

When the machine is at rest the air pressure on both sides of the diaphragms 42, 45 and 64 is equal and they will, therefore, assume central positions. As the airplane is set in motion and gradually gains speed, the pressure on the lower camber will increase and a rarefaction will take place on or near the top camber. This will cause a consequent movement of the diaphragms against the tension of the calibrating springs and the devices will weigh the forces tending to maintain the apparatus in the air. The flexing of the diaphragms 42 and 45 will cause the arm 50 to move downward vertically without contacting with either of the points 52 or 53. The diaphragm 60 will be equally flexed and the arm of the bellcrank 61 will move downward so that the hook 62 will not contact with the forked ends of the bellcrank. The registering devices 35 and 37 will, therefore, indicate to the aviator that the device is proceeding at the proper angle of incidence commensurate with the speed.

Should the angle of incidence change, the diaphragm 60 will get out of step with the diaphragms 42 and 45, and one of the forked ends of the bellcrank 61 will make contact with the hook 62, the circuit of the motor 64 will be closed and the motor will rotate to elevate or depress the elevator 67 as the case may be, and bring the machine to the proper angle.

Should the lift at one side of the aerofoil become less than at the other, the machine will tend to tip over toward that side, for example, the left wing tip, having the less pressure on the bottom camber. The diaphragm 45 will be flexed toward the calibrating spring. The horizontal arm of the bellcrank 49 will be moved upward, the arm 50 will pivot on the end of the bellcrank 48, the arm 50 will be tilted to make contact with the point 52, the circuit through the motor 55 will be closed and the motor will rotate to depress the aileron 59 and elevate the aileron 58. This will bring the aerofoil into lateral equilibrium.

If the lift at the right wing tip decreases the diaphragm 42 will be acted on as above described, the motor will rotate in the opposite direction and the aileron 58 will be depressed and 59 will be elevated until the balance is restored.

When it is desired to manually stabilize the machine the switch 68 will be opened. This will cut out the automatic features and the device may be stabilized longitudinally and laterally by any well known method. If it be desired to climb or dive, the switch 68 is closed and the switch 70 is opened, and the elevator may be manipulated manually. This will leave the lateral stabilizing automatically controlled. By opening the switch 69, the automatic lateral stabilizing may be cut out.

In Fig. 13 I have shown a device for longitudinal stabilizing only. This device is identical with the horizontal stabilizer above described except that the contact points for the bellcrank are stationary.

In Fig. 14 is diagrammatically shown a device for making a permanent record of the movements of the pressure responsive means. A bellcrank 71 is connected to the diaphragm of the pressure responsive means and one arm of the bellcrank is provided with a marker which engages a constantly moving surface such as a tape 72. When the diaphragm is in the central position, a straight line will be made along the center of the tape. As the diaphragm is flexed, the marking will be made above or below the central line, as the diaphragm is moved to one side or the other.

My invention may be employed to indicate the angle of incidence and the air speed on one dial as shown in Fig. 15. When this form of my invention is used, the device shown in Fig. 7 is preferably employed. The hand 40 is geared to the diaphragm 36 as in Fig. 6. An air-speed meter of any preferred construction is geared to the hand 39 in the indicator 37ª. Air entering the orifice 73 will pass through a tube 74 to one side of a diaphragm 76 in a casing 75. The opposite side of the diaphragm is in a partial vacuum formed by the air suction back of the orifice, which will withdraw the air from that side of the casing through a tube 74. The diaphragm 76 is geared to the hand 39 and the air speed will be indicated on the dial of the indicator.

I desire to have it understood that when the device is employed to indicate the angle of incidence and the speed, the diaphragm 36 may be located at a distance from the wing in the same manner as is the diaphragm 60 in Fig. 12, and the said diaphragm and the diaphragm 76 may be arranged as in Fig. 14, so that a permanent record of the angle of incidence and the speed of the machine may be made.

If desired a rudder (not shown) may be employed in the embodiment of my invention shown in Fig. 7 for the purpose of supplementing the effect of the ailerons in rolling or yawing. The rudder may be manually controlled or it may be automatically operated in unison with the aileron or ailerons.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having thus described my invention what I now claim as new and desire to secure by Letters Patent, is:

1. A flying machine having an aerofoil, means responsive to air reactions at a plurality of points on the aerofoil and due to that relative movement of the air and aerofoil, which produces the necessary lifting forces, and means operated by the average of said reactions for stabilizing the machine.

2. A flying machine having an aerofoil, means responsive to air reactions at a plurality of points on the aerofoil and due to that relative movement of the air and aerofoil which produces the necessary lifting forces, and means operated by the average of said reactions for stabilizing the machine with reference to its lateral axis.

3. A flying machine having an aerofoil, means responsive to air reactions at a plurality of points on the aerofoil and due to that relative movement of the air and aerofoil which produces the necessary lifting forces, and means operated by the average of said reactions for operating the elevator and stabilizing the machine with reference to its lateral axis.

4. A flying machine having an aerofoil and stabilizing devices, means responsive to the average of the air reactions due to that relative movement of the air and aerofoil which produces the necessary lifting forces at a plurality of points near the lateral extremities of the aerofoil, and means controlled by movements of said responsive means for operating the stabilizing devices for stabilizing the machine with reference to its longitudinal axis.

5. A flying machine having an aerofoil and ailerons, means responsive to the average of the air reactions due to that relative movement of the air and aerofoil which produces the necessary lifting forces at a plurality of points near the lateral extremities of the aerofoil, and means controlled by movements of said responsive means for operating the ailerons for stabilizing the machine with reference to its longitudinal axis.

6. A flying machine having an aerofoil, a diaphragm responsive to the average of the air reactions due to that relative movement of the air and aerofoil which produces the necessary lifting forces at a plurality of points near the lateral extremities of the aerofoil, and means controlled by movements of said diaphragm for stabilizing the machine with reference to its logitudinal axis.

7. A flying machine having an aerofoil, a diaphragm in communication with the atmosphere at a plurality of points near each wing tip and responsive to the average of air reactions at the points and due to that relative movement of the air and aerofoil which produces the necessary lifting forces near the lateral extremities of the aerofoil, and means controlled by movements of said diaphragms for stabilizing the machine with reference to its longitudinal axis.

8. A flying machine having an aerofoil, an aileron at each side of the longitudinal axis of the machine, means on each side of said axis responsive to air reactions due to that relative movement of the air and aerofoil which produces the necessary lifting forces, said means communicating with the atmosphere at a plurality of points on each of the top and bottom cambers of the aerofoil, whereby an average of the reactions will be impressed upon the responsive means, and means operated by the responsive means for operating the ailerons for lateral stabilizing of the machine.

9. A flying machine having an aerofoil, an aileron at each side of the longitudinal axis of the machine, means on each side of said axis responsive to air reactions due to that relative movement of the air and aerofoil which produces the necessary lifting forces, said means communicating with the atmosphere at a plurality of points on each of the top and bottom cambers of the aerofoil, whereby an average of the reactions will be impressed upon the responsive means, means operated by the responsive means for operating the ailerons for lateral stabilizing of the machine, and means for disconnecting the aileron operating means.

10. A flying machine comprising an aerofoil and ailerons, a plurality of tubes communicating with the atmosphere at the top camber of the aerofoil near one lateral extremity thereof, a plurality of tubes communicating with the atmosphere at the bottom camber near the same extremity, all of said tubes communicating with a chamber, a diaphragm in the chamber, the tubes from the top camber entering the chamber at one side of the diaphragm, and the tubes from the bottom camber entering the chamber at the opposite side of the diaphragm, and connections between the diaphragms and the ailerons.

11. A flying machine comprising an aerofoil and ailerons, a plurality of tubes communicating with the atmosphere at the top camber of the aerofoil near each lateral extremity thereof, a plurality of tubes communicating with the atmosphere at the bottom camber near each extremity, all of said tubes communicating with a chamber, a diaphragm in the chamber, the tubes from the top camber entering the chamber at one side of the diaphragm, and the tubes from the bottom camber entering the chamber at the opposite side of the diaphragm, and connections between the diaphragm and the ailerons.

12. A flying machine comprising an aerofoil and ailerons, a plurality of tubes communicating with the atmosphere at the top camber of the aerofoil near each lateral extremity thereof, a plurality of tubes communicating with the atmosphere at the bottom camber near each extremity, the tubes communicating with the top camber at one extremity of the aerofoil communicating with a common chamber, the tubes communicating with the bottom camber at the same extremity communicating with a common chamber, said chambers communicating with a casing and at opposite sides of a diaphragm carried by the casing, a reversible motor, connections between the diaphragms and the motor, and connections between the motor and ailerons whereby the ailerons will be operated as the air reactions due to that relative movement of the air and aerofoil which produces the necessary lifting forces varies at the entrances of the tubes at the top and bottom cambers.

This specification signed and witnessed this twenty-sixth day of September, 1917.

JOHN NEWBERRY REYNOLDS.

Witnesses:
J. F. COLEMAN,
A. E. RENTON.